Nov. 25, 1941.　　　　G. R. ERICSON　　　　2,264,113

RAZOR

Filed May 26, 1937

GEORGE R. ERICSON
INVENTOR.

BY Ralph T. Bassett

ATTORNEY.

Patented Nov. 25, 1941

2,264,113

UNITED STATES PATENT OFFICE 2,264,113

RAZOR

George R. Ericson, St. Louis, Mo.

Application May 26, 1937, Serial No. 144,955

8 Claims. (Cl. 30—43)

This invention comprehends certain improvements in power driven razors of that type utilizing a rotating cylindrical cutter having a multiplicity of cutting or shearing faces operating in conjunction with a shear plate, the latter also functioning as a guard, and embodies in such an assembly details of construction which not only facilitate the cutting operation but also materially reduce the cost of manufacture.

More specifically the main improvement lies in the form and construction of the cylindrical cutter which is fabricated from a plurality of relatively thin disks, the peripheral edges of each of which is provided with a multiplicity of transverse, angular or curved cutting faces, formed by any suitable method and extending entirely through the disk body.

Another feature of this invention resides in the assembly of the disks in the formation of the cutting cylinder whereby the entity of each minute cutting face on each disk is individually preserved and at the same time each of the cutting faces of all of the disks are definitely arranged for individual cutting operations, and definitely related to each other to produce a continuous shearing or cutting throughout the length of the cylinder.

Still other features such as the drive mechanism, the tensioning of the cutting cylinder and shear or guard plate, and structural details enabling quick dismantling and assembly will more clearly hereinafter appear by reference to the accompanying specification and drawing forming parts of this application and wherein like characters of reference designate corresponding parts throughout the several views, in which.

Figure 1:
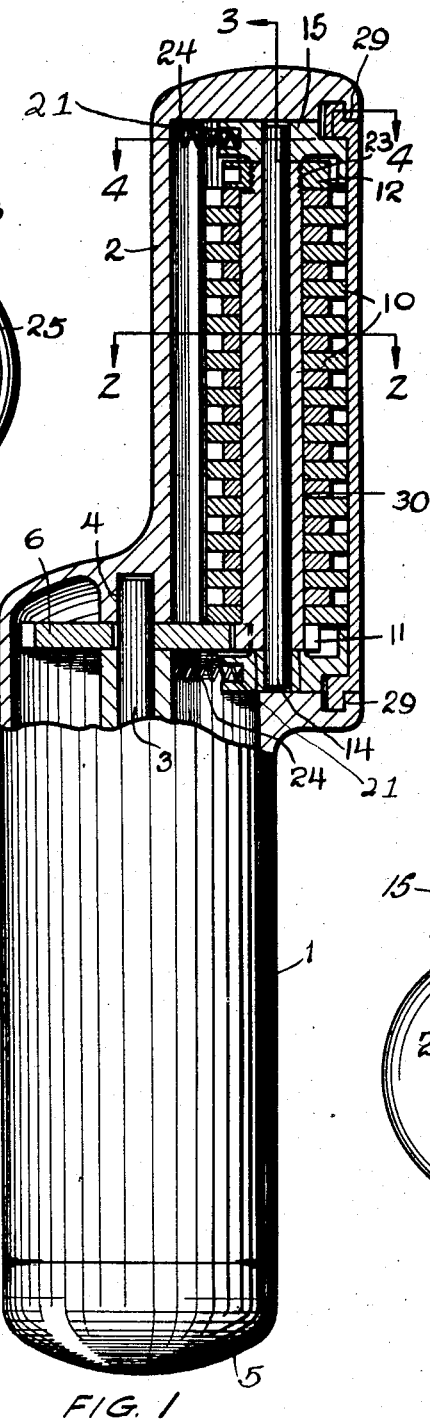
Fig. 1 is a plan view partly in section showing the assembly.

In the present disclosure a casing is illustrated including a handle 1, which is of a size and structure to house a suitable spring or electric motor and a smaller offset semi-cylindrical casing 2 for partially enclosing the cutting cylinder, the offset of the cutter casing being sufficient to permit the convenient use of the device. In Fig. 1 a driven shaft 3 is shown, mounted at one end in socket 4 of the casing 1 and at the other in a similar socket formed in the removable cap 5. This cap permits assembly of the structure, repair and replacement of parts. Keyed on the end of the shaft 3 adjacent the inner end wall is the gear 6 through which power is applied to the rotating cutting cylinder as hereinafter described.

Figure 3:
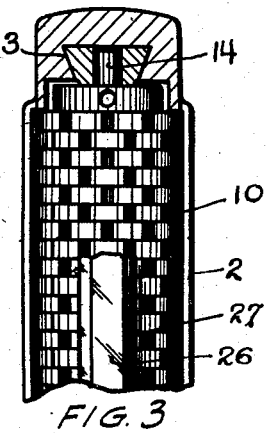
Fig. 3 is a fragmentary plan view of the cutter with the guard element partially removed.
Figure 5:
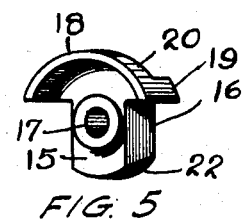
Fig. 5 is a perspective showing the bearing element.
Figure 4:
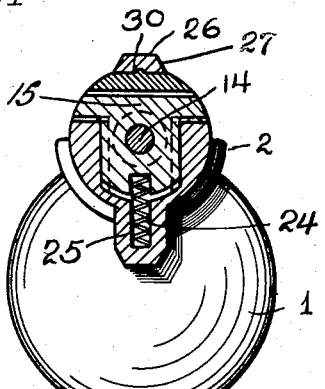
Fig. 4 is a section on line 4—4 of Fig. 1.

The cutting cylinder includes a hub 8 formed to include keys 9 on which the disks 10 forming the cylinder are positioned and secured in compact relation. The inner end of the hub 8 is provided with gear 11 which meshes with the drive gear 6 on the motor shaft and this gear also functions to act as a stop for the disks 10. The outer end of the hub 8 is threaded to receive a nut 12. This structure permits removal of parts and quick assembly and adjustments. The cutting cylinder is mounted on shaft 14 and the ends of this shaft are journaled in spring mounted bearings shown in detail in Fig. 5. Each bearing is identical being of general T-shape form to include a body 15 formed with outwardly inclined walls 16 and centrally positioned cylindrical bearing sockets 17 in which the ends of the shaft 14 are mounted. The horizontal upper portion of the bearing is of arcuate form and includes the inner flange 18 and outer flange 19, the latter being notched at 20 to permit passage of the extremities of the cutter or shear plate. Cylindrical openings forming spring seats 21 are formed in the body 15 extending centrally into the lower wall 22 so that the axis of the seat will intersect the axis of the cylindrical bearing sockets 17. The dovetailed openings 23 shown in Fig. 3 are of a size and shape to snugly receive the guide bodies 15 and permit their movement under tension of coiled springs 24, the latter being retained in position at their outer ends by virtue of confining wall portions 25 on analogous parts or structures.

Figure 8:
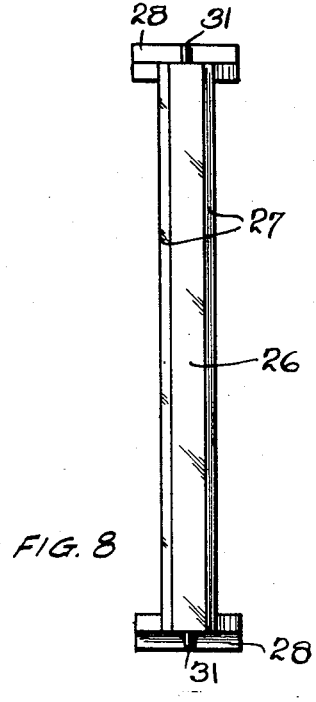
Fig. 8 is a plan view of the fixed guard.

The shear or cutter plate shown in plan at Fig. 8 includes an elongated body 26 of relatively thin, hard metal having beveled longitudinal edges 27 and offset or hooked end portions 28 which engage under the lips 29 formed at and defining the ends of the front opening of the cutter housing. The lips 29 are formed with aligned centrally positioned longitudinal grooves 30 in which the ribs 31 of the offset ends of the shear plate seat to prevent lateral shifting of these parts.

Figure 6:
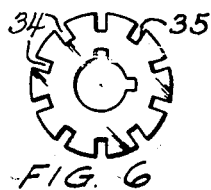
Fig. 6 is a plan view of one of the disks forming the cutter cylinder.
Figure 2:
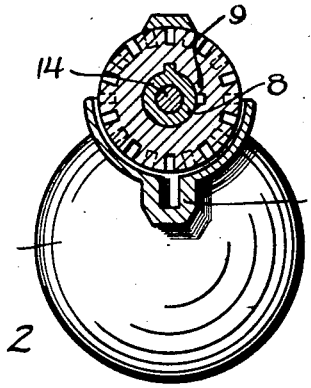
Fig. 2 is a transverse section on line 2—2 of Fig. 1.
Figure 7:
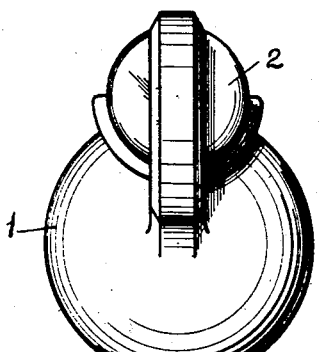
Fig. 7 is an end view.

Referring now to the cutter cylinder it will be seen that each of the disks forming a part thereof is of relatively thin material ranging from 20/1000 to 1/8 of an inch and as clearly illustrated in Fig. 6 the peripheral edge is notched at spaced points 34 to form cutting faces 35. Any suitable means may be utilized in forming these notches or kerfs and the cutting walls may be transverse, angular, or curved as desired.

With reference to assembling the device it will be seen that in the first instance the casing 1 is so constructed that the motor, which may be of any type, is inserted after removal of the cap 5, the shaft socket 4 being so positioned that alignment of the parts and of the driving gear 6 is readily assured. The cutter cylinder which includes the hub 8 and the disks together with the gear 11 and the locking nut 12, is positioned on the shaft 14 and the bearings 15 are positioned on the end of this shaft. Due to the inclined wall 16 of the bearings these parts may be slid into the dovetailed sockets 23 formed in the end wall of the cutter casing against the tension of the springs 24. The shear plate is slid laterally into position, the hooked ends 28 of the shear plate engaging beneath the lips 29 of the casing. The ends of the shear plate fit within the cut-out portions 20 of the arcuate flanges 19 thus locking the latter together with the cutter in position. The springs 24 acting against the bearings 15 will urge the cutter cylinder against the shear plate thus insuring the essential contacting of these parts during the cutting operation.

While the present structure may be desirable it will be obvious that many details of construction may be changed and features added enabling the use of the cutter cylinder which constitutes the essence of the invention. Inasmuch as each cutting face is defined by the thickness of the disks forming the cylinder the range of each cutting operation is of necessity limited to a minute area. The limited span of the cutting face reduces to this infinitesimal surface the possible range of injury without, on the other hand, in any way altering the entire cutting operation which extends throughout the length of the cylinder. This is due to the staggering or alternating of the cutting faces of each disk. Essentially the same results might be obtained by substituting for the built up cylindrical structure a solid cylindrical structure, however, the present sectional body permits methods of manufacture which would not be practical were a solid cylindrical structure utilized.

What I claim as new and desire to secure by Letters Patent is:

1. A razor structure including a rotating cylinder formed of a plurality of disks, means for securing said disks in alignment, each of said disks being formed with a multiplicity of transverse kerfs one longitudinally extending wall of each of which includes a shearing face, the kerfs of one disk being staggered in assembly with respect to the kerfs of the adjacent disk, a cutter blade, and means for retaining the cutter blade and the rotary cylinder in normal contact.

2. A safety razor including a driving means and a cutter cylinder, a cutter plate, said cylinder being formed of a plurality of relatively thin transverse sections having adjacent side marginal faces contacting and each section having its peripheral edge notched, said notches having at least one wall embodying a shearing face for cooperation with said cutter plate.

3. In a safety razor including a driving means, a cutter member driven by said means, a shear plate, means for urging the cutter member and shear plate into cutting relation, said cutter member comprising a plurality of thin plates in fixed relation forming a compact body, each of said plates having its edge scored to produce radiating wall portions forming spaced transverse cutting faces, and each plate being arranged with relation to its adjacent plate so that the cutting faces are in offset position with alternate cutting faces of the several plates in end to end alignment.

4. A cutting cylinder for use in cooperation with a shear plate comprising a multiplicity of thin disks arranged in compact relation, each of said disks being formed with a plurality of equally spaced kerfs in its peripheral edge forming cutting faces and each of said disks being arranged with relation to each adjacent disk so that the cutting faces are in staggered relation whereby alternate cutting faces and substantially flush working faces are provided in longitudinal alignment with relation to and in cooperation with the shear plate.

5. A razor structure including a movable body formed of a plurality of relatively thin plates, means for securing said plates together to provide an aligned working face, each of said plates being formed with a multiplicity of transverse kerfs one wall of which forms a shearing face, the kerfs of certain plates being staggered in assembly with respect to the kerfs of the adjacent plates to provide aligned alternate shear faces and working faces, a cutter blade, and means for retaining the cutter blade and the working face of said movable body in normal shearing contact.

6. In a safety razor, a blade, a rotatable cylindrical body formed of a plurality of disks notched at their peripheral edges, one wall of each notch in said disks forming a relatively short longitudinally extending shearing face, said disks being arranged with the notches staggered whereby each shearing face is spaced from the adjacent shearing faces, and means for securing said disks with their side marginal portions in compact abutting relation.

7. A safety razor including a laminated metal body, each lamina being formed with a series of transverse slots and abutting the adjacent lamina at its marginal side portions adjacent said slots, the slots of each alternate lamina being relatively staggered to form a plurality of radiating relatively short spaced shearing faces defined by interposed supporting portions, a cutting element adjacent said body and cooperating with said shearing faces and interposed supporting portions, and means for moving the body and cutting element relatively to each other to provide a shearing action therebetween.

8. A safety razor, a blade, a movable shear body for cooperation with said blade formed of a plurality of thin plates having transverse notches, said plates being arranged in compact working alignment with marginal portions adjacent said notches in contact, and the walls of said notches forming at their outer edges shear faces.

GEORGE R. ERICSON.